Aug. 2, 1927.  
C. A. GODSHALK  
LOCKED NUT APPARATUS  
Filed Nov. 23, 1923  
1,637,995
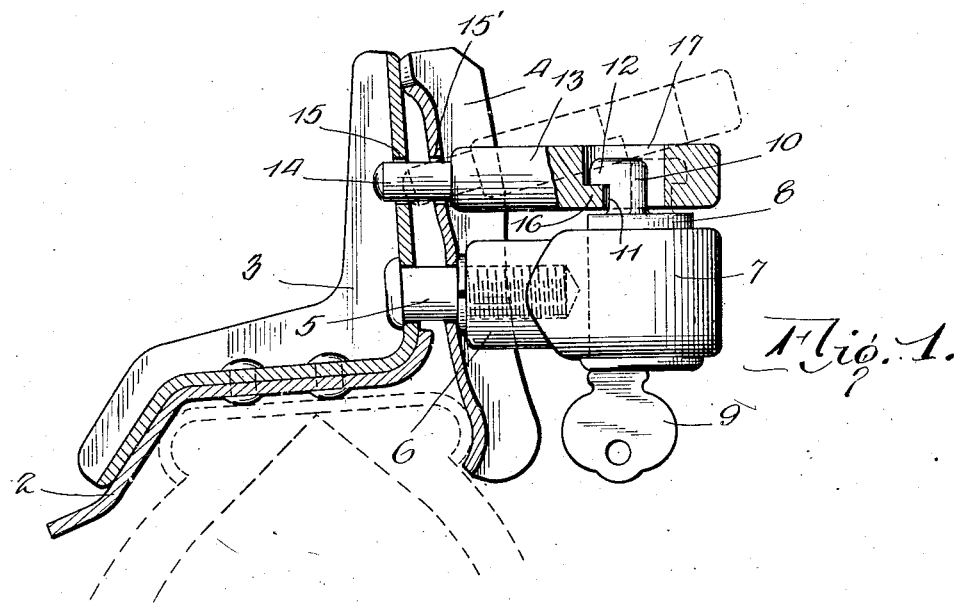
Fig. 1.
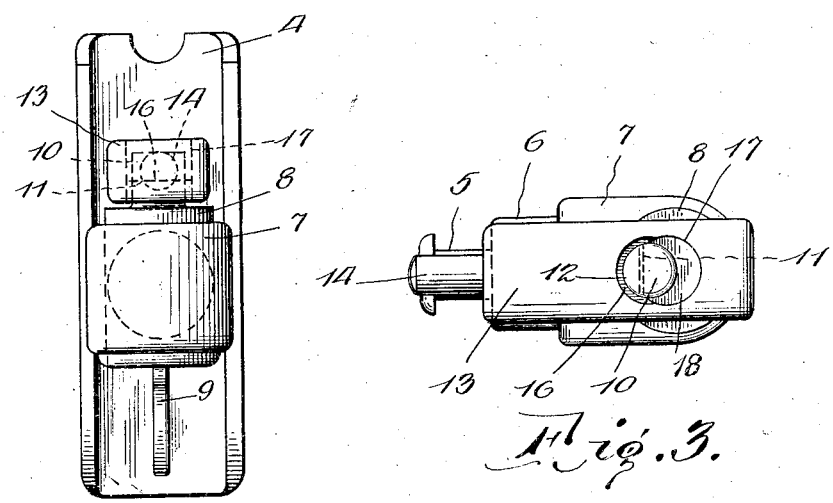
Fig. 2.
Fig. 3.
Inventor,
Clarence A. Godshalk,
By John S. Barker
Attorney Patented Aug. 2, 1927.

1,637,995

UNITED STATES PATENT OFFICE.

CLARENCE A. GODSHALK, OF PHILADELPHIA, PENNSYLVANIA.

LOCKED-NUT APPARATUS.

Application filed November 23, 1923. Serial No. 676,596.

It is often desirable that nuts employed to hold together parts of apparatus or machinery should remain in the position to which they are set until released by some one authorized to manipulate them, that is to say, they should be locked against unauthorized manipulation of a meddler or person maliciously inclined.

My invention has for its object to produce a nut and associated co-operating parts by means of which the nut after being applied may be secured by a key-operated lock that will prevent the removal of the nut by any except one having a key adapted to be used in connection with the lock.

My invention is adapted for a wide variety of uses, as for instance, where parts of machinery are to be secured by a nut, the unauthorized tampering with which is to be prevented; in connection with railway switches, and with the lock mechanism for the spare tires of automobiles.

I have, in the accompanying drawings and for the purpose of illustration, shown my invention as applied to a spare tire lock.

Fig. 1 is an elevation, with parts in section, illustrating my invention used in connection with a lock for the spare tire of an automobile.

Fig. 2 is an end view of such a lock, and

Fig. 3 is a top plan view.

In the drawings 2 designates the ring or holder upon which is supported the rim of a spare tire, such holder being usually secured to the rear of an automobile. To this holder is riveted or otherwise secured a bracket 3. A screw-threaded bolt or pin 5 extends outward from the face of the bracket 3, and is adapted to pass freely through an aperture in the clamp piece 4 that engages with the tire rim to hold it upon the support 2. The parts thus far described are well known in the art and are standard equipment upon many automobiles. They may be varied in details of construction so far as my invention is concerned.

A nut 6 engages with the screw-threaded bolt 5 and is employed to bear against the clamp piece 4, and force it against the rim of the tire as the nut is screwed upon the bolt. This nut is connected with or carried by a casing 7, being either integral therewith or secured fast thereto as may be preferred, and in this casing is mounted the body 8 of a key-operated lock. The lock may be of one form or another, that indicated being of the pin tumbler type arranged to be operated by a special key 9. From the rear or inner end of the rotative barrel 18 of the lock extends an eccentrically disposed projection 10 that is cut away on one side, as at 11, to produce a lip 12.

13 indicates a post having at one end a reduced portion or pin 14 that is adapted to fit into the aligning openings 15, 15' formed respectively in the bracket 3 and clamp piece 4. These openings are usually provided in the standard equipment of tire holding parts as now manufactured and I have arranged to take advantage of them for supporting the post 13. This post is a removable part that when applied and in use is rigid or immovable relative to the screw-threaded bolt 5, nut 6 and casing 7, it being, in the arrangement illustrated, substantially parallel with, and offset from the bolt. An opening 17 is formed through the post 13, which, when the post is set, as represented in the drawings, is opposite to the projection 10 carried by the barrel of the lock. On one side of the opening is a segmental shelf 16 that is adapted to lie within the recess 11 when the projection 10, having passed into the opening 17, is turned to locking position, as represented in Figs. 1 and 2.

The invention described is used as follows: A tire rim is applied to the holder as usual and the clamp put in place. The nut 6 is screwed upon the pin 5, forcing the clamp against the tire rim and the latter upon the holder. The nut being screwed tight against the clamp piece and occupying the position indicated in the drawings, the barrel of the lock is turned, by the use of the key 9, so that the eccentric projection 10 occupies the position indicated in dotted lines in Fig. 1, that is, with the lip 12 pointing outward. The post 13 is then applied, the reduced end 14 thereof being inserted through the openings 15, 15', and the perforated portion thereof slipped over the eccentric projection 10 of the lock. The post in being applied moves from the position indicated in dotted lines to that shown in full lines, Fig. 1, and while this movement is taking place the barrel of the lock is turned from the dotted line to the full line position, the result of which is that the eccentric projection 10 engages with the shelf 16 of the post, forcing the reduced end of the post into the apertures 15, 15' and at the same time carrying the lip 12 of the projection behind such shelf, thus locking the post in its seat and to the casing 7 that is carried by the nut. The parts being now in the position represented in full lines in Fig. 1 the key 9 of the lock may be removed, and it will be impossible to either turn the nut or to remove the post to which the nut has been locked. The parts described are so fitted that when in locked position they tightly engage one with the other.

The part designated 13 in the drawings and herein termed a post, is an element that is fixed or rigid with reference to the nut when the latter is locked thereto. If the apparatus to which the invention is applied has a fixed part in convenient position, with reference to the screw-threaded bolt or pin, and nut thereon, to serve as a part with which the lock may engage, that could be used for the purpose herein described. However, in that embodiment of my invention represented in the drawings no permanent part of the apparatus is found located adjacent to but offset from the nut and its casing, with which the movable part of the lock may engage, and I therefore use a separable post that may be applied when the nut is to be locked, and which may be omitted when a nut is used without a lock. Whether, however, the post be permanently fixed or removable, as in the present instance, it is sufficiently rigid and fixed when in use to serve the purpose for which it is intended, that is, as a part to which the nut may be locked by the use of key-operated mechanism.

It has already hereinbefore been stated that the post to which the nut is anchored or locked is parallel with the pin or bolt on which the nut is placed, and it will also be observed that the axis of the barrel of the lock is at right angles to the axis about which the nut turns. This arrangement makes it possible to use a lock bolt of the character described in nearly any situation that may be found in existing machinery or apparatus.

What I claim is:—

1. The combination with a screw-threaded pin and a nut adapted to engage therewith, of a post spaced transversely from the nut and pin, and a key-operated lock mechanism adapted to unite the nut and post, and prevent rotation of the former.

2. The combination with a screw-threaded pin and a nut adapted to engage therewith, of a removable post spaced transversely from the nut and pin, and a key-operated lock mechanism adapted to unite the nut and post.

3. The combination with a screw-threaded pin and a nut adapted to engage therewith, of a post fixed adjacent to but offset from the nut and pin, and approximately parallel with the latter, and a key-operated lock mechanism adapted to unite the nut and post, and prevent rotation of the former.

4. The combination with a screw-threaded pin and a nut adapted to engage therewith, of a casing united with the nut, a post spaced transversely from the nut and pin, and a key-operated lock mechanism within the said casing having a part adapted to be made to engage with the post to prevent rotation of the nut.

5. The combination with a screw-threaded pin and a nut adapted to engage therewith, of a casing carried by the nut, a separable post adapted to be fixed in a position transversely adjacent to the nut, and a key-operated lock mechanism supported in the casing having a part that is adapted to be made to engage with the post when the latter is set, to prevent rotation of the nut.

6. The combination with a screw-threaded pin and a nut adapted to engage therewith, of a casing carried by the nut, a lock mechanism mounted in the casing having a part projecting laterally beyond the casing, and adapted to be moved by a key that fits the lock, and a post fixed transversely adjacent to the nut and casing having an opening into which the projection of the lock is adapted to enter and engage with the post when moved by the key.

7. The combination with a holder for a spare tire, a screw-threaded pin extending therefrom and a clamp piece adapted to slip over the pin and serving to hold the tire rim in place, of a nut adapted to engage with the threaded pin and bear against the clamp piece, a lock casing carried by the nut, and a separable post adapted to be supported by the tire holder, and lock mechanism within the casing having a part adapted to be moved into locking engagement with the post, to prevent turning of the nut, by the use of the proper key.

8. The combination with a holder for a spare tire, a screw-threaded pin projecting therefrom, and a clamp piece adapted to slip over the pin and serving to hold the tire rim in place, the holder and clamp piece having formed in them aligning openings, of a nut engaging the pin for forcing the clamp piece into engagement with the rim of the tire, a lock casing carried by the nut, a separable post having a portion adapted to be seated in the aligning openings in the tire holder and clamp piece, whereby it is supported adjacent to the screw-threaded pin, the post having formed in it an opening, and a key-operated lock supported in the said casing, having a projection adapted to enter the opening in the post and to be moved into locking engagement with the latter by the use of the proper key.

9. The combination with a screw-threaded pin and a nut adapted to engage therewith, of a casing united with the nut so as to turn therewith, and a lock mechanism located within the casing having a projecting movable part extending out from the casing at substantially right angles to the axis of the pin and adapted to engage with a rigid part offset from the nut to lock the nut thereto against rotation.

10. The combination with a screw-threaded pin and a nut adapted to engage therewith, of a casing united with the nut so as to turn therewith, a key-operated lock mechanism mounted in the casing and having a turning barrel, and an eccentrically arranged projection extending from the end of the barrel laterally beyond the casing and adapted to engage with a rigid part located adjacent to the pin and thus lock the nut against rotation.

11. The combination of a screwthreaded pin, a clamp piece adapted to fit over the pin and serve to hold an article in place, a nut for engaging with the pin and serving to force the clamp into holding position, a key-operated lock the body of which is seated in a casing carried by the nut so as to turn therewith, the lock having a projecting part adapted to be moved by the use of a proper key, and a rigid part with which the said movable projecting part of the lock may be caused to engage, such rigid part being located adjacent to but offset from the pin, and serving when the movable part of the lock is brought into engagement therewith to prevent the turning of the nut upon the pin.

12. A new article of manufacture, consisting of a nut formed with an enlarged body or casing located at the end of the nut and closing the screw-threaded opening therein, a key-operated lock set into the said casing of the nut and formed with a part adapted to be moved by the use of a proper key, said moving part having a portion adapted to be projected laterally into locking position beyond the peripheral portion of the casing of the nut by the use of a key.

13. The combination with a screw-threaded pin and a nut adapted to engage therewith, of a rigid part spaced transversely from the pin, and a key-operated lock arranged to unite the nut and the said rigid part and prevent rotation of the former upon the pin.

14. The combination with a screw-threaded pin and a nut adapted to engage therewith, of a rigid part spaced transversely from the pin, and a key-operated lock supported in the nut and arranged to unite the nut and the said rigid part and thereby prevent rotation of the former.

15. The combination with a screw-threaded pin and a nut adapted to engage therewith, of a movable post adapted to be set in position to directly interfere with and prevent the turning of the nut, and a lock carried by the nut and engaging with the post to prevent its removal.

CLARENCE A. GODSHALK.